United States Patent
Horie et al.

(10) Patent No.: US 12,299,425 B2
(45) Date of Patent: May 13, 2025

(54) REMOVING REDUNDANT CODE

(71) Applicant: INTERNATIONAL BUSINESS MACHINES CORPORATION, Armonk, NY (US)

(72) Inventors: Michihiro Horie, Ageo (JP); Kazunori Ogata, Soka (JP)

(73) Assignee: International Business Machines Corporation, Armonk, NY (US)

(*) Notice: Subject to any disclaimer, the term of this patent is extended or adjusted under 35 U.S.C. 154(b) by 72 days.

(21) Appl. No.: 18/369,347

(22) Filed: Sep. 18, 2023

(65) Prior Publication Data

US 2025/0094147 A1   Mar. 20, 2025

(51) Int. Cl.
*G06F 8/41* (2018.01)
*G06F 8/30* (2018.01)

(52) U.S. Cl.
CPC ............ *G06F 8/4435* (2013.01); *G06F 8/315* (2013.01); *G06F 8/433* (2013.01)

(58) Field of Classification Search
None
See application file for complete search history.

(56) References Cited

U.S. PATENT DOCUMENTS

| | | | |
|---|---|---|---|
| 5,805,894 A * | 9/1998 | Robison | G06F 8/433 717/155 |
| 9,378,000 B1 * | 6/2016 | Lee | G06F 8/75 |
| 2016/0179478 A1 | 6/2016 | Bates et al. | |
| 2017/0052764 A1 * | 2/2017 | Laskey | G06F 8/31 |
| 2020/0081693 A1 | 3/2020 | Moussa et al. | |
| 2020/0278876 A1 * | 9/2020 | Douglas | G06F 8/4441 |
| 2024/0103821 A1 * | 3/2024 | Sockalingasamy | G06F 8/433 |

OTHER PUBLICATIONS

Sipek et al., "Enhancing Performance of Cloud-based Software Applications with GraalVM and Quarkus", https://arxiv.org/ftp/arxiv/papers/2201/2201.11851.pdf, Sep. 28, 2020; 6 Pages.
Anonymous, Native Image, https://www.graalvm.org/native-image/, Page Accessed Jun. 1, 2023; 3 Pages.
Abdi et al., "Small-Amp: Test amplification in a dynamically typed language", https://link.springer.com/article/10.1007/s10664-022-10169-8, Jul. 8, 2022; 55 Pages.
Anonymous, "ProGuard Manual", https://www.guardsquare.com/manual/home, Page Accessed Jun. 20, 2023; 4 Pages.
Oracle, "Chapter 14. Blocks and Statements", https://docs.oracle.com/javase/specs/jls/se7/html/jls-14.html#jls-14.10, Accessed Sep. 12, 2023; 41 Pages.

(Continued)

*Primary Examiner* — Marina Lee
(74) *Attorney, Agent, or Firm* — Monchai Chuaychoo; Andrew D. Wright; Calderon Safran & Wright P.C.

(57) ABSTRACT

Embodiments determine that a compiler option is not provided to enable an assertion for a reachable class in a target application, determine that there is no application program interface (API) being used to enable the assertion found in a reachable method in the reachable class, determine that there is no assertion being executed before an initialization of the reachable class, and remove assertion related code from the reachable class.

20 Claims, 7 Drawing Sheets

(56) References Cited

OTHER PUBLICATIONS

Quarkus, "Supersonic/ Subatomic/ Java", https://quarkus.io/, Accessed Sep. 12, 2023; 11 Pages.
Qbicc, "Native Image Compilation for Java programs", https://github.com/qbicc, Accessed Sep. 12, 2023; 2 Pages.
GraalVM, "Build faster, smaller, leaner applications", https://www.graalvm.org/, Accessed Sep. 12, 2023; 4 Pages.
GraalVM, "Class Initialization in Native Image", https://www.graalvm.org/22.1/reference-manual/native-image/ClassInitialization/, Accessed Sep. 12, 2023; 3 Pages.
Oracle, "Class ClassLoader", https://docs.oracle.com/en/java/javase/17/docs/api/java.base/java/lang/ClassLoader.html#setClassAssertionStatus(java.lang.String,boolean), Accessed Sep. 18, 2023; 19 Pages.

\* cited by examiner

REMOVING REDUNDANT CODE

BACKGROUND

Aspects of the present invention relate generally to removing redundant code and, more particularly, to removing redundant code for assertions at a build time of native images.

Statistically compiling programs to generate native images has become popular for microservices and serverless applications. In particular, the static compilation of programs is performed before running the service. In contrast, a standard program execution flow is performed using a just-in-time (JIT) compiler.

SUMMARY

In a first aspect of the invention, there is a computer-implemented method including: determining, by the processor set, that a compiler option is not provided to enable an assertion for a reachable class in a target application; determining, by the processor set, that there is no application program interface (API) being used to enable the assertion found in a reachable method in the reachable class in response to a determination that the compiler option is not provided to enable the assertion for the reachable class; determining, by the processor set, that there is not assertion being executed before an initialization of the reachable class in response to a determination that there is no API being used to enable the assertion found in the reachable method in the reachable class; and removing, by the processor set, assertion related code from the reachable class in response to a determination that there is not assertion being executed before the initialization of the reachable class.

In another aspect of the invention, there is a computer program product including one or more computer readable storage media having program instructions collectively stored on the one or more computer readable storage media. The program instructions are executable to: determine that a compiler option is not provided to enable an assertion for a reachable class in a target application; determine that there is no application program interface (API) being used to enable the assertion found in a reachable method in the reachable class in response to a determination that the compiler option is not provided to enable the assertion for the reachable class; determine that there is not assertion being executed before an initialization of the reachable class in response to a determination that there is no API being used to enable the assertion found in the reachable method in the reachable class; and remove assertion related code from the reachable class in response to a determination that there is not assertion being executed before the initialization of the reachable class.

In another aspect of the invention, there is a system including a processor set, one or more computer readable storage media, and program instructions collectively stored on the one or more computer readable storage media. The program instructions are executable to: determine that a compiler option is not provided to enable an assertion for a reachable class in a target application; determine that there is no application program interface (API) being used to enable the assertion found in a reachable method in the reachable class in response to a determination that the compiler option is not provided to enable the assertion for the reachable class; determine that there is not assertion being executed before an initialization of the reachable class in response to a determination that there is no API being used to enable the assertion found in the reachable method in the reachable class; and remove assertion related code from the reachable class in response to a determination that there is not assertion being executed before the initialization of the reachable class.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
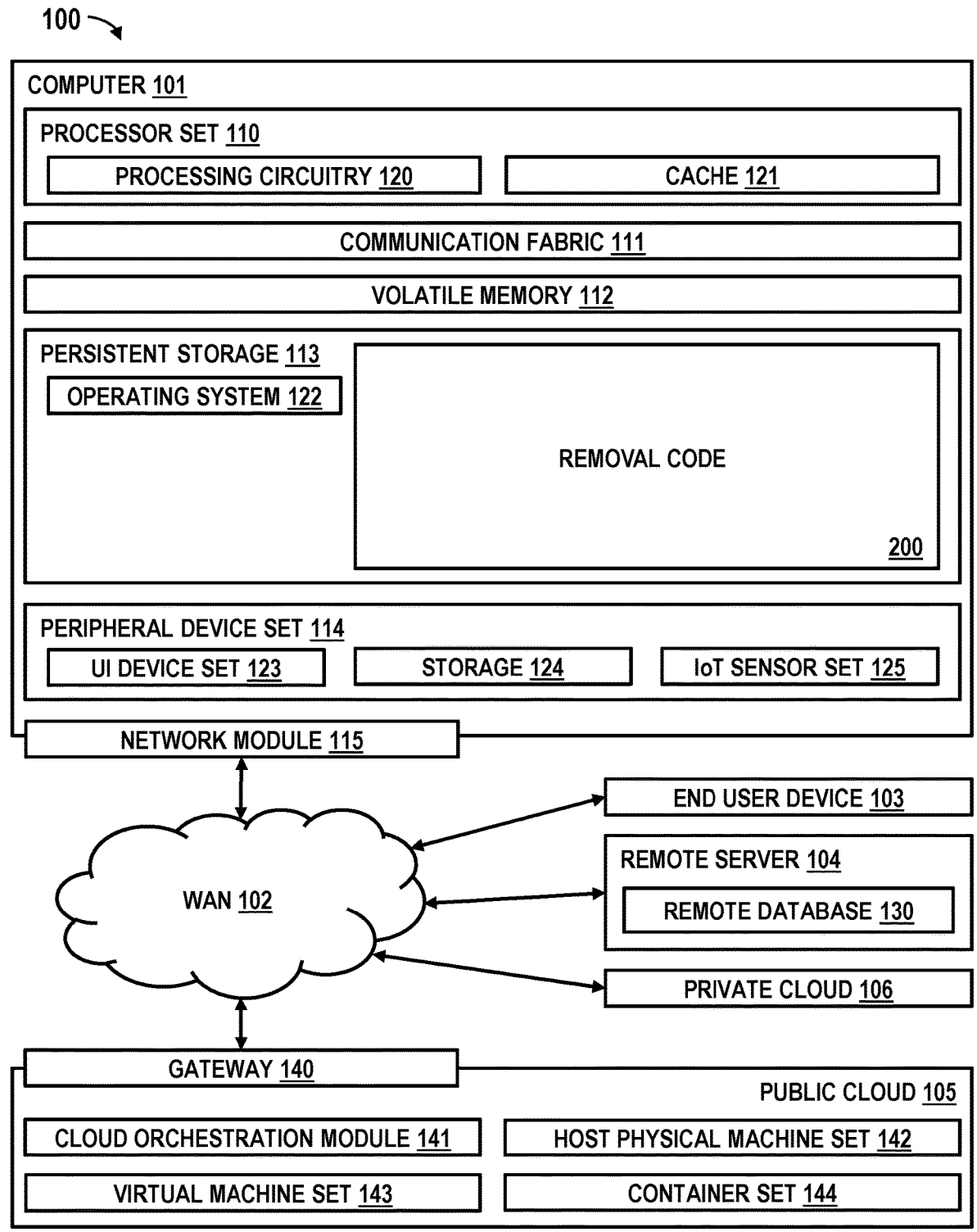
FIG. 1 depicts a computing environment according to an embodiment of the present invention.

In a first aspect of the invention, there is a computer-implemented method including: determining, by a processor set, that a compiler option is not provided to enable an assertion for a reachable class in a target application; determining, by the processor set, that there is not application program interface (API) being used to enable the assertion found in a reachable method in the reachable class in response to a determination that the compiler option is not provided to enable the assertion for the reachable class; determining, by the processor set, that there is no assertion being executed before an initialization of the reachable class in response to a determination that there is no API being used to enable the assertion found in the reachable method in the reachable class; and removing, by the processor set, assertion related code from the reachable class in response to a determination that there is no assertion being executed before the initialization of the reachable class. In particular, embodiments may improve performance of statis compilation by removing redundant code.

The computer-implemented method may include determining that the reachable class is initialized at a different time than a compilation time in response to a determination that there is the reachable class in the target application. In particular, embodiments may improve static compilation by determining an initialization of a reachable class.

The computer-implemented method may include determining whether the reachable method in the reachable class uses an assertion; and ending compilation in response to a determination that the reachable method in the reachable class does not use the assertion. In particular, embodiments may improve static compilation by determining whether an assertion is used.

The computer-implemented method may include finding at least one super class in a reachable class hierarchy from the reachable class; and finding a super class of the at least one super class that has a static initializer. In particular, embodiments may improve static compilation by finding a super class that has a static initializer.

The computer-implemented method may include traversing a static initializer to check the reachable method; and determining whether the reachable method is found in the static initializer. In particular, embodiments may improve static compilation by traversing a static initializer.

The computer-implemented method may include ending compilation in response to determining that the reachable method is found in the static initializer; and retuning a no in response to determining that the reachable method is not found in the static initializer. In particular, embodiments may improve static compilation by determining whether the reachable method is found in the static initializer.

The computer-implemented method may include the reachable method including a method which is explicitly invoked in a main method. In particular, embodiments may improve static compilation by explicitly invoking a method within a main method.

The computer-implemented method may include the reachable class occurring when a class is executed by a virtual machine (VM). In particular, embodiments may improve static compilation by executing a class by a virtual machine (VM).

The computer-implemented method may include the reachable class and the source code including an object-oriented language. In particular, embodiments may improve static compilation by including an object-oriented language.

The computer-implemented method may include outputting a native image with the assertion related code removed from the reachable class. In particular, embodiments may improve static compilation by outputting a native image with removed assertion related code from the reachable class.

The computer-implemented method may include running the native image with the assertion related code removed from the reachable class. In particular, embodiments may improve static compilation by running the native image with removed assertion related code from the reachable class.

In another aspect of the invention, there is a computer program product including program instructions executable to: determine that a compiler option is not provided to enable an assertion for a reachable class in a target application; determine that there is not application program interface (API) being used to enable the assertion found in a reachable method in the reachable class in response to a determination that the compiler option is not provided to enable the assertion for the reachable class; determine that there is no assertion being executed before an initialization of the reachable class in response to a determination that there is no API being used to enable the assertion found in the reachable method in the reachable class; and remove assertion related code from the reachable class in response to a determination that there is no assertion being executed before the initialization of the reachable class. In particular, embodiments may improve performance of statis compilation by removing redundant code.

The computer program product may include determining that the reachable class is initialized at a different time than a compilation time in response to a determination that there is the reachable class in the target application. In particular, embodiments may improve static compilation by determining an initialization of a reachable class.

The computer program product may include determining whether the reachable method in the reachable class uses an assertion; and ending compilation in response to a determination that the reachable method in the reachable class does not use the assertion. In particular, embodiments may improve static compilation by determining whether an assertion is used.

The computer program product may include finding at least one super class in a reachable class hierarchy from the reachable class; and finding a super class of the at least one super class that has a static initializer. In particular, embodiments may improve static compilation by finding a super class that has a static initializer.

The computer program product may include traversing a static initializer to check the reachable method; and determining whether the reachable method is found in the static initializer. In particular, embodiments may improve static compilation by traversing a static initializer.

The computer program product may include ending compilation in response to determining that the reachable method is found in the static initializer; and retuning a no in response to determining that the reachable method is not found in the static initializer. In particular, embodiments may improve static compilation by determining whether the reachable method is found in the static initializer.

The computer program product may include the reachable class occurring when a class is executed by a virtual machine (VM), and the reachable class includes an object-oriented language. In particular, embodiments may improve static compilation by executing a class by a virtual machine (VM).

The computer program product may include running a native image with the assertion related code removed from the reachable class. In particular, embodiments may improve static compilation by running the native image with removed assertion related code from the reachable class.

In another aspect of the invention, there is a system including program instructions executable to: determine that a compiler option is not provided to enable an assertion for a reachable class in a target application; determine that there is not application program interface (API) being used to enable the assertion found in a reachable method in the reachable class in response to a determination that the compiler option is not provided to enable the assertion for the reachable class; determine that there is no assertion being executed before an initialization of the reachable class in response to a determination that there is no API being used to enable the assertion found in the reachable method in the reachable class; and remove assertion related code from the reachable class in response to a determination that there is no assertion being executed before the initialization of the reachable class. In particular, embodiments may improve performance of statis compilation by removing redundant code.

Aspects of the present invention relate generally to removing redundant code and, more particularly, to removing redundant code for assertions at a build time of native images. Embodiments of the present invention improve the performance of static compilation by removing redundant code. Embodiments of the present invention remove unnecessary code derived from assertions at static compilation time. Embodiments of the present invention also perform an entire program analysis at the static compilation time and check each class that does not use an assertion. Embodiments of the present invention remove redundant code during static compilation of Java® programs. Java is a registered trademark of Oracle. However, embodiments are not limited in this example. Embodiments of the present invention also can remove redundant code in any object-oriented language that is capable of using a static compiler instead of a just-in-time compiler (e.g., C++, Python®, etc.) Python is a registered trademark of the Python Software Foundation.

Embodiments of the present invention provide a computer-implemented method, a system, and a computer program product for improving compilation time by removing redundant code during static compilation before running a service. In contrast, conventional systems of static compilers are not able remove redundant code after static compilation due to a lack of a just-in-time (JIT) compilation feature. Further, although some conventional systems use a build-time initialization to remove redundant code, the build-time initialization in conventional systems may not be safe when a static initializer has a side effect during production, such as a file input/output. Accordingly, embodiments of the present invention improve compilation time by removing redundant code during static compilation in a safe manner during a production process.

Embodiments of the present invention include a highly computationally efficient system, method, and computer program product for improving performance of static compilation by removing redundant code. Accordingly, implementations of the present invention provide an improvement (i.e., technical solution) to a problem arising in the technical field of static compilation, which significantly impacts compilation performance in comparison to just-in-time (JIT) compilation. In particular, embodiments of the present invention remove unnecessary code derived from assertions at a static compilation time. Also, embodiments of the present invention perform an entire program analysis during the static compilation time and check each class that does not use the assertion. Embodiments of the present invention may not be performed in the human mind because aspects of the present invention improve compilation performance by removing redundant code of programs.

Implementations of the present invention are necessarily rooted in computer technology. For example, the step of removing redundant code during static compilation of a program is computer-based and cannot be performed in the human mind. Removing redundant code during static compilation of the program is, by definition, performed by a computer and cannot practically be performed in the human mind (or with pen and paper) due to the complexity of removing code in real-time during static compilation. Thus, it is simply not possible for the human mind, or for a person using pen and paper, to remove redundant code in real-time during static compilation of a program.

Aspects of the present invention include a method, system, and computer program product for optimizing a program by removing unnecessary assertions during static compilation. For example, a computer-implemented method includes: analyzing an entire program to check a plurality of conditions for each class and record each class if the conditions are met; and removing assertion related code in each class that is recorded in the analyzing. The plurality of conditions include having no compilation parameter that enables assertions, having no chance of enabling assertions via an application programming interface (API), and having no chance of executing assertions before a class initialization.

In aspects of the present invention, the analyzing the entire program further includes: not optimizing the program in response to a single use of the API related to assertions such as ClassLoader's setClassAssertionStatus (String className, boolean enabled) and ClassLoader's setPackageAssertionStatus (String packageName, boolean enabled) is found; checking each class hierarchy on whether it contains a circularity in a static initialization; and not optimizing the program in response to a class hierarchy containing the circularity. In embodiments, the removing the assertion related code further includes setting an assertion flag (e.g., $assertionsDisabled) to be true in a static initializer so that latter compilation phrases can remove the redundant code if ($assertionsDisabled) assertion flag exists. In embodiments, the checking the plurality of conditions further includes: checking whether a method uses an assertion; checking a class declaring the method on whether an initialization has been completed by searching an existence of any other waiting thread to execute the static initializer of that class in response to the method using the assertion; and not optimizing the program in response to the initializing not being completed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as removal code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
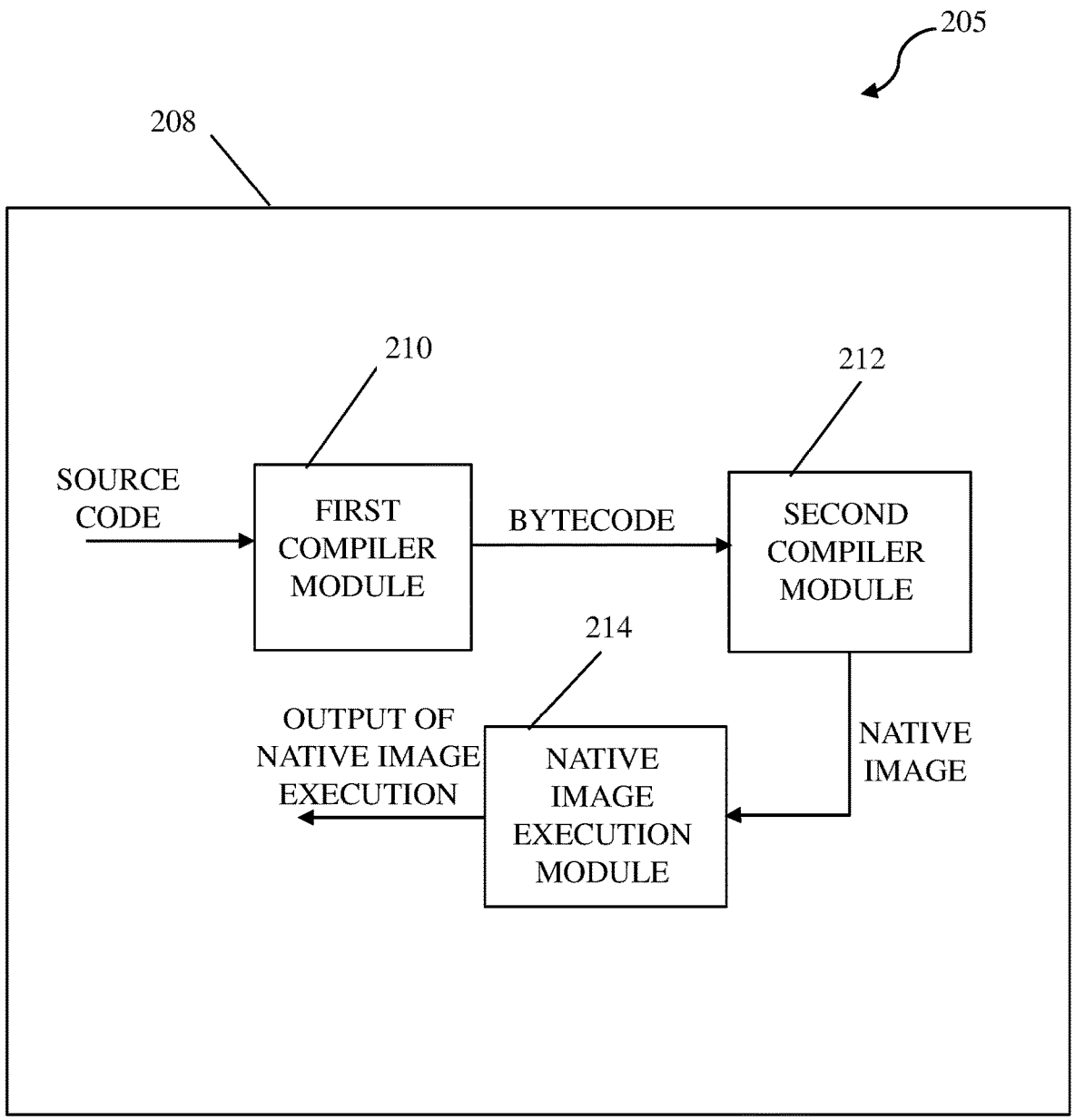
FIG. 2 shows a block diagram of an exemplary environment in accordance with aspects of the present invention.

FIG. 2 shows a block diagram of an exemplary environment 205 in accordance with aspects of the present invention. In embodiments, the environment 205 includes a removal server 208, which may comprise one or more instances of the computer 101 of FIG. 1. In other examples, the removal server 208 comprises one or more virtual machines or one or more containers running on one or more instances of the computer 101 of FIG. 1.

In embodiments, the removal server 208 of FIG. 2 comprises a first compiler module 210, a second compiler module 212, and a native image execution module 214, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the present invention as described herein. These modules of the code of block 200 are executable by the processing circuitry 120 of FIG. 1 to perform the inventive methods as described herein. The removal server 208 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In FIG. 2, and in accordance with aspects of the present invention, the first compiler module 210 receives a source code from a computer application of a computing device. In embodiments, the first compiler module 210 receives the source code, analyzes the source code, and compiles the source code into bytecode. In embodiments, the bytecode comprises a set of commands for a virtual machine (VM) and is an intermediate code representation. In embodiments, the first compiler module 210 sends the bytecode to the second compiler module 212. In embodiments the source code may be java source code, the bytecode may be java bytecode, and the virtual machine (VM) may be java virtual machine (JVM). However, embodiments are not limited to this example, and the source code, the bytecode, and the virtual machine (VM) may correspond with any object-oriented language such as C++ or Python.

In embodiments of FIG. 2, the second compiler module 212 receives the bytecode from the first compiler module 210. In embodiments, the second compiler module 212 determines whether there is any further reachable class in a target application. In embodiments, the further reachable class comprises an object-oriented language. In embodiments, a class is reachable when the class can be executed by the VM. The second compiler module 212 ends a compilation in response to a determination that there is no further reachable class in the target application. In embodiments, the second compiler module 212 determines whether the reachable class is initialized at compilation time in response to the determination that there is a further reachable class in the target application. In particular, the second compiler module 212 determines where there is a compiler option to initialize the further reachable class at runtime. In embodiments, the second compiler module 212 ends the compilation in response to a determination that the reachable class is initialized at the compilation time.

In embodiments of FIG. 2, the second compiler module 212 determines whether there is a compiler option to enable an assertion for the further reachable class in response to a determination that the reachable class is not initialized at the compilation time. In embodiments, the second compiler module 212 ends the compilation in response to the compiler option being able to enable the assertion for the further reachable class. In embodiments, the second compiler module 212 determines whether there is an application programming interface (API) used to enable the assertion found in a reachable method in the further reachable class. For example, the API used to enable assertions may include ClassLoader.setClassAssertion Status (String className, boolean enabled) and ClassLoader.setPackageAssertionStatus (String packageName, boolean enabled). In embodiments, the reachable method is a method which is explicitly invoked in a main method. In embodiments, the second compiler module 212 ends the compilation in response to a determination that the API being used to enable the assertion found in the reachable method in the further reachable class.

In embodiments of FIG. 2, the second compiler module 212 determines whether assertions are being executed before initialization of the further reachable class. In embodiments, the second compiler module 212 ends the compilation in response to a determination that the assertions are being executed before the initialization of the further reachable class. In embodiments, the second compiler module 212 removes assertion related code from the further reachable class in response to a determination that the assertions are not being executed before the initialization of the further reachable class. Further, after removal of the assertion related code, the second compiler module 212 repeats the steps above by returning to a step of determining whether there is any further reachable class in the target application.

In embodiments of FIG. 2, the determining whether assertions are being executed before initialization of the further reachable class by the second compiler module 212 includes a plurality of sub-steps. In particular, the plurality of sub-steps includes a first sub-step of determining whether the reachable method in the further reachable class uses an assertion. In embodiments, the second compiler module 212 returns a yes and thus ends the compilation in response to a determination that the reachable method in the further reachable class does not use the assertions and thus ends the compilation. In embodiments, the plurality of sub-steps includes a second sub-step of finding super classes in a class hierarchy from the further reachable class in response to a determination the reachable method in the further reachable class using the assertion. In embodiments, the plurality of sub-steps includes a third sub-step of finding the super classes that have a static initializer. In embodiments, the plurality of sub-steps includes a fourth sub-step of traversing the static initializer to check the reachable method. In embodiments, the plurality of sub-steps includes a fifth sub-step of determining whether the reachable method is found in the static initializer. In embodiments, the second compiler module 212 returns a yes and thus ends the compilation in response to a determination that the reachable method is found in the static initializer. In embodiments, the second compiler module 212 returns a no in response to a determination that the reachable method is not found in the static initializer. In embodiments, the second compiler module 212 removes the assertion related code from the further reachable class in response to the no being returned. In embodiments, the second compiler module 212 improves static compilation time by removing the assertion related code.

In FIG. 2, and in accordance with aspects of the present invention, the second compiler module 212 sends a native image with any assertion related code having been removed to the native image execution module 214. In embodiments, the native image execution module 214 runs the native image with any assertion related code having been removed. In further embodiments, the native image execution module 214 returns an output of the native image execution to the removal server 208 in response to running the native image with the assertion related code having been removed.

Figure 3:
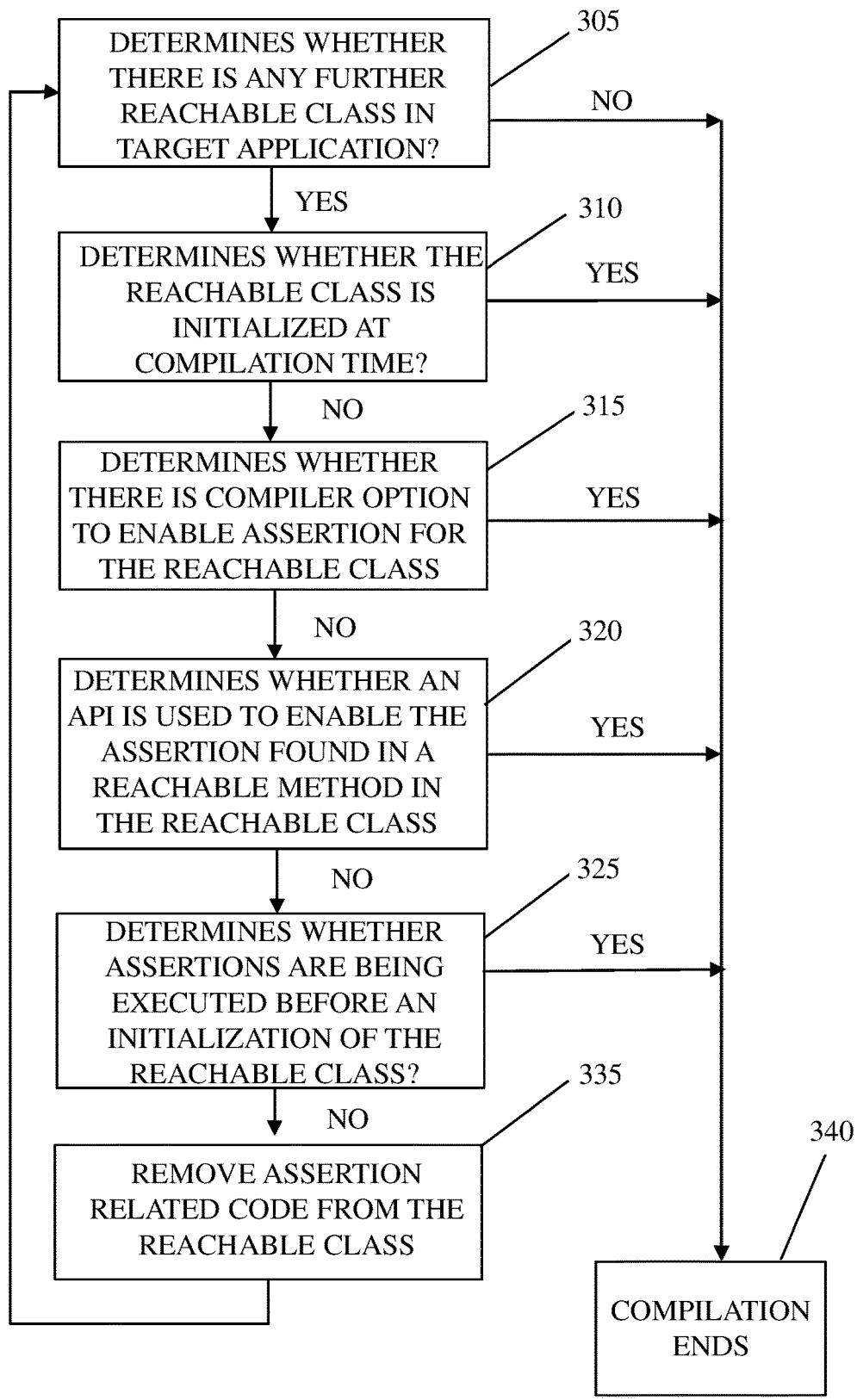
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

In embodiments of FIG. 3, at step 305, the system determines, at the second compiler module 212, whether there is any further reachable class in a target application. In embodiments and as described with FIG. 2, the second compiler module 212 moves to step 340 and ends a compilation in response to a determination that there is no further reachable class in the target application.

At step 310, the system determines, at the second compiler module 212, whether the further reachable class is initialized at compilation time in response to a determination that there is the further reachable class in the target application. In embodiments and as described with FIG. 2, the second compiler module 212 moves to step 340 and ends the compilation in response to the further reachable class being initialized at the compilation time.

At step 315, the system determines, at the second compiler module 212, whether there is a compiler option to enable an assertion for the further reachable class in response to a determination that the further reachable class not being initialized at the compilation time. In embodiments and as described with FIG. 2, the second compiler module 212 moves to step 340 and ends the compilation in response to the compiler option enabling the assertion for the further reachable class.

At step 320, the system determines, at the second compiler module 212, whether an application programming interface (API) is used to enable the assertion found in a reachable method in the further reachable class in response to a determination that there is no compiler option enabling the assertion for the further reachable class. In embodiments and as described with FIG. 2, the second compiler module 212 moves to step 340 and ends the compilation in response to the API being used to enable the assertion found in the reachable method in the further reachable class.

At step 325, the system determines, at the second compiler module 212, whether assertions are being executed before an initialization of the further reachable class in response to the API not being used to enable the assertion found in the reachable method in the further reachable class. In embodiments and as described with FIG. 2, the second compiler module 212 moves to step 340 and ends the compilation in response to a determination that the assertions are being executed before the initialization of the further reachable class. In embodiments, step 325 has a plurality of sub-steps which will be described herein in FIG. 4.

At step 335, the system removes, at the second compiler module 212, assertion related code from the further reachable class in response to a determination that the assertions are not being executed before the initialization of the further reachable class. In embodiments and as described with FIG. 2, the second compiler module 212 repeats the steps above by returning to step 305 to determine whether there is any further reachable class in the target application.

Figure 4:
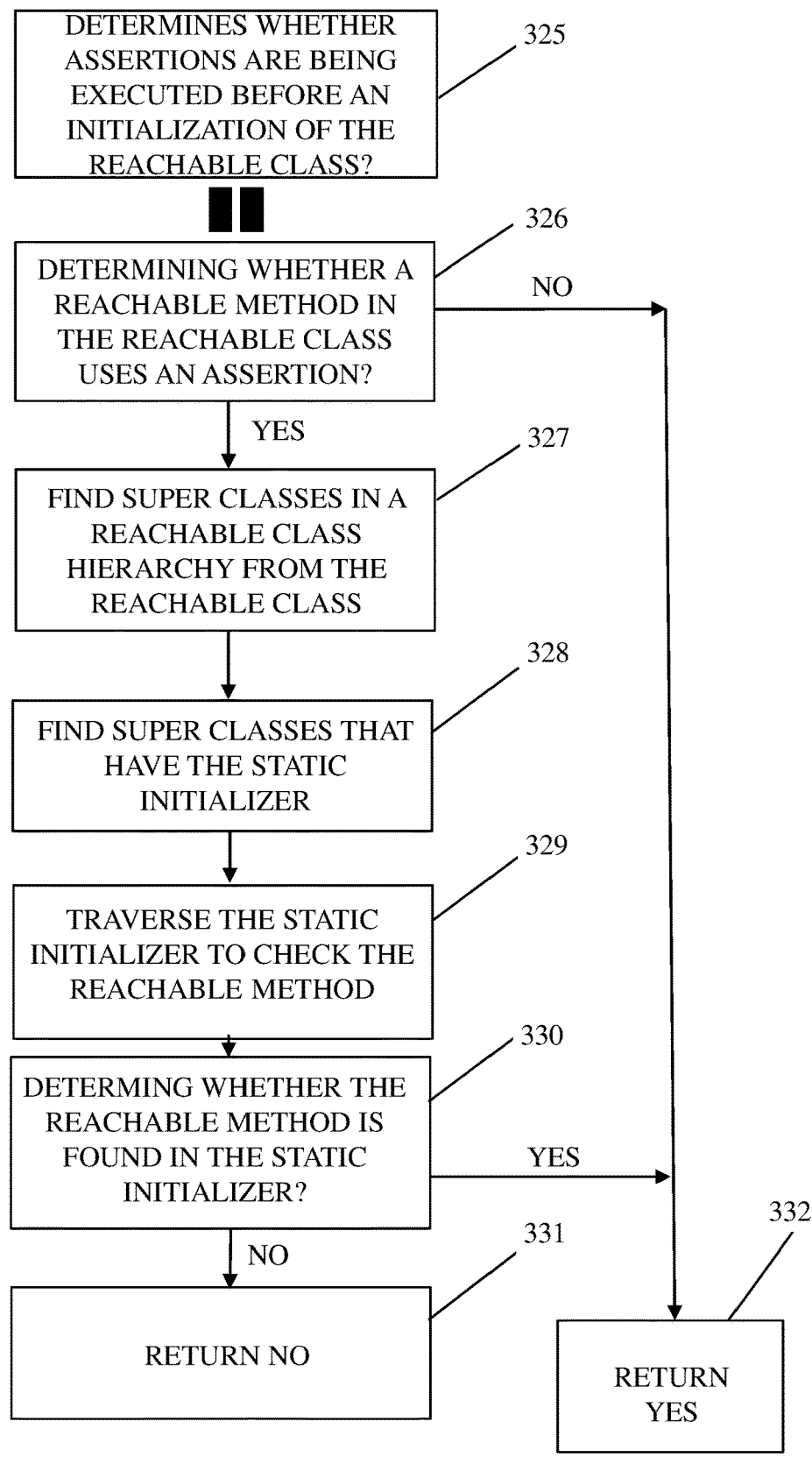
FIG. 4 shows a flowchart of another exemplary method in accordance with aspects of the present invention.

FIG. 4 shows a flowchart of an exemplary method in accordance with aspects of the present invention. Steps of the method may be carried out in the environment of FIG. 2 and are described with reference to elements depicted in FIG. 2.

In embodiments of FIG. 4, steps 326, 327, 328, 329, 330, 331, and 332 are sub-steps of step 325 in FIG. 3. Further, step 331 returns a no (which corresponds with a no from step 325) and then the system moves to step 335 for removal of the assertion related code. In contrast, step 332 returns a yes (which corresponds with a yes from step 325) and then the system moves to step 340 which ends the compilation.

In embodiments of FIG. 4, at step 326, the system determines, at the second compiler module 212, whether a reachable method in the further reachable class uses an assertion. In embodiments and as described with FIG. 2, the second compiler module 212 returns a yes at step 332 and then moves to step 340 which ends the compilation in response to a determination that the reachable method in the further reachable class does not use the assertion.

In embodiments of FIG. 4, at step 327, the system finds, at the second compiler module 212, super classes in a reachable hierarchy from the further reachable class in response to a determination the reachable method in the further reachable class uses the assertion. At step 328, the system finds, at the second compiler module 212, the super classes that have the static initializer. At step 329, the system traverses, at the second compiler module 212, the static initializer to check the reachable method.

In embodiments of FIG. 4, at step 330, the system determines, at the second compiler module 212, whether the reachable method is found in the static initializer. In embodiments and as described with FIG. 2, the second compiler module 212 returns a yes at step 332 and then moves to step 340 which ends the compilation in response to a determination that the reachable method is found in the static initializer. In embodiments, the second module 212 returns a no at step 331 and then moves to step 335 for removal of the assertion related code in response to a determination the reachable method is not found in the static initializer.

Figure 5:
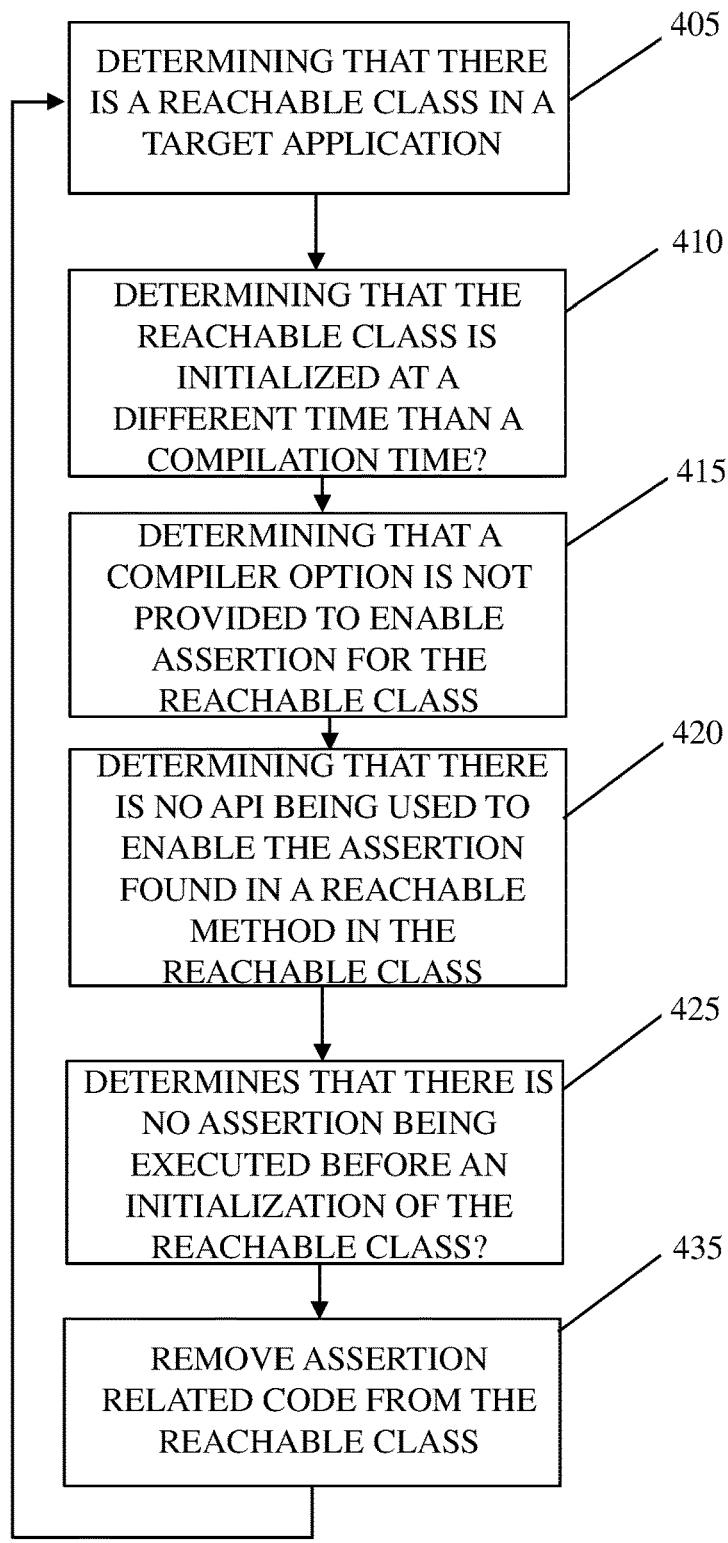
FIG. 5 shows a flowchart of an exemplary method in accordance with aspects of the present invention.

FIG. 5 shows a flowchart of an exemplary method in accordance with aspects of the present invention. Steps of the method may be carried out in the environment of FIG. 2 and are described with reference to elements depicted in FIG. 2.

In embodiments of FIG. 5, at step 405, the system determines, at the second compiler module 212, that there is a reachable class in a target application. At step 410, the system determines, at the second compiler module 212, that the reachable class is initialized at a different time than a compilation time in response to a determination that there is the reachable class in the target application. At step 415, the system determines, at the second compiler module 212, that a compiler option is not provided to enable an assertion for the reachable class in response to a determination that the reachable class is initialized at a different time than the compilation time.

At step 420, the system determines, at the second compiler module 212, that there is no application programming interface (API) being used to enable the assertion found in a reachable method in the reachable class in response to a determination that a compiler option is not provided to enable the assertion for the reachable class. At step 425, the system determines, at the second compiler module 212, that there is no assertion being executed before an initialization of the reachable class in response to a determination that there is no API being used to enable the assertion found in the reachable method in the reachable class. In embodiments, step 425 has a plurality of sub-steps which will be described herein in FIG. 6.

At step 435, the system removes, at the second compiler module 212, assertion related code from the further reachable class in response to a determination that there is no assertions being executed before the initialization of the reachable class. In embodiments and as described with FIG. 2, the second compiler module 212 repeats the steps above by returning to step 405 to determine whether there is any further reachable class in the target application.

Figure 6:
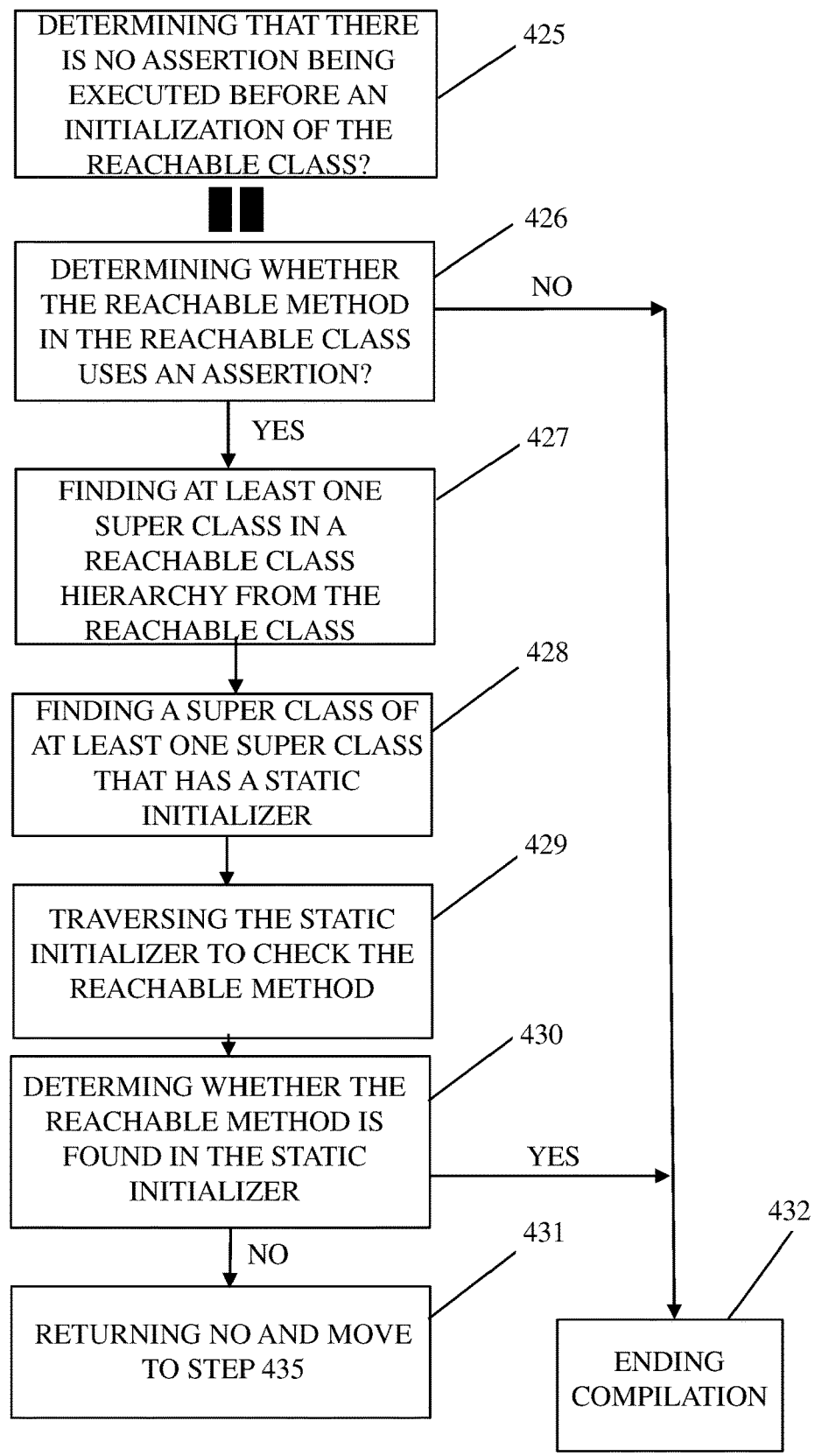
FIG. 6 shows a flowchart of another exemplary method in accordance with aspects of the present invention.

FIG. 6 shows a flowchart of an exemplary method in accordance with aspects of the present invention. Steps of the method may be carried out in the environment of FIG. 2 and are described with reference to elements depicted in FIG. 2.

In embodiments of FIG. 4, steps 426, 427, 428, 429, 430, 431, and 432 are sub-steps of step 425 in FIG. 3. Further, step 431 returns a no (which corresponds with a no from step 425) and then the system moves to step 435 for removal of the assertion related code. In contrast, step 432 ends the compilation.

In embodiments of FIG. 4, at step 426, the system determines, at the second compiler module 212, whether a reachable method in the reachable class uses an assertion. In embodiments and as described with FIG. 2, the second compiler module 212 ends the compilation at step 432 in response to a determination that the reachable method in the reachable class does not use the assertion.

In embodiments of FIG. 4, at step 427, the system finds, at the second compiler module 212, at least one super class in a reachable hierarchy from the reachable class in response to a determination the reachable method in the reachable class uses the assertion. At step 428, the system finds, at the second compiler module 212, a super class that has a static initializer. At step 429, the system traverses, at the second compiler module 212, the static initializer to check the reachable method.

In embodiments of FIG. 4, at step 430, the system determines, at the second compiler module 212, whether the reachable method is found in the static initializer. In embodiments and as described with FIG. 2, the second compiler module 212 returns a yes and then moves to step 432 which ends the compilation in response to a determination that the reachable method is found in the static initializer. In embodiments, the second compiler module 212 returns a no at step 431 and then moves to step 435 for removal of the assertion related code in response to a determination that the reachable method is not found in the static initializer.

Figure 7:
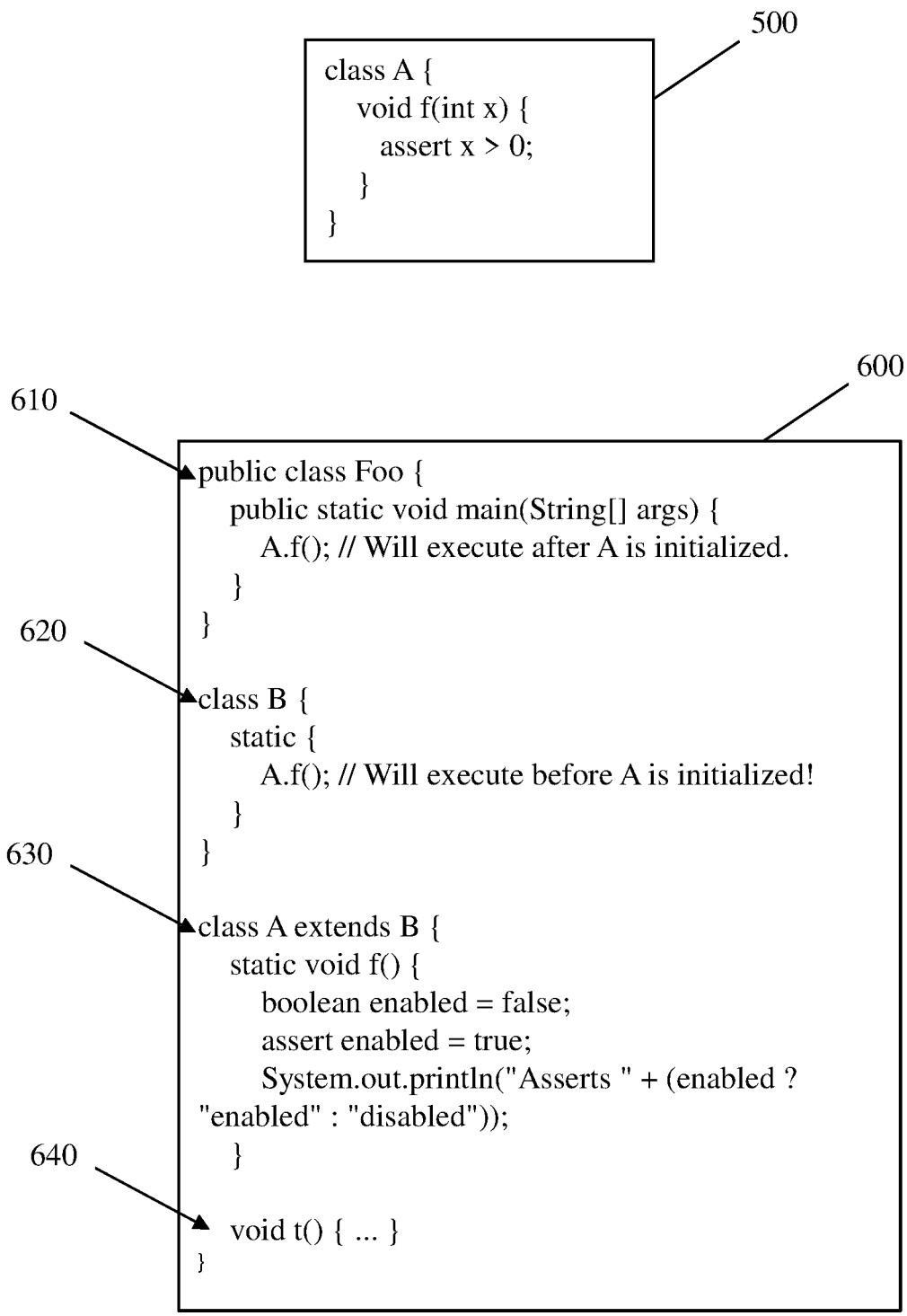
FIG. 7 shows an example of software code in accordance with aspects of the present invention.

FIG. 7 shows an example of software code in accordance with aspects of the present invention. In embodiments of FIG. 7, a first sample java code 500 includes a class A and a second sample java code 600 includes a public class Foo 610, a class B 620, a class A extends B 630, and a t method 640. In embodiments and as described with respect to FIG. 4, at step 326, the system determines, at the second compiler module 212, whether a reachable method in the further reachable class uses an assertion. Accordingly, as a result of performing step 326, the system determines that the further reachable class is class A extends B 630 uses an assertion (e.g., "assert enabled=true") and then moves to step 327.

In embodiments and as described with respect to FIG. 4, at step 327, the system finds, at the second compiler module 212, super classes in a reachable hierarchy from the further reachable class in response to a determination the reachable method in the further reachable class uses the assertion. Accordingly, as a result of performing step 327, the system determines that the super classes in the reasonable hierarchy are the public class Foo 610 and the class B 620.

In embodiments and as described with respect to FIG. 4, at step 328, the system finds, at the second compiler module 212, super classes that have the static initializer. Accordingly, as a result of performing step 328, the system determines that the super class public class Foo 610 has the static initializer (e.g., A is statically initialized before executing an assertion statement).

In embodiments and as described with respect to FIG. 4, at step 329, the system determines, at the second compiler module 212, whether the reachable method is found in the static initializer. Accordingly, as a result of performing step 329, the system determines that the reachable method (e.g., static void f( ) in class A extends B 630) is not found in the static initializer. Thus, the second compiler module 212 returns a no at step 331 in FIG. 4 and then moves to step 335 in FIG. 3 for removal of the assertion related code in response to a determination the reachable method is not found in the static initializer.

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the present invention provides a computer-implemented method, via a network. In this case, a computer infrastructure, such as computer 101 of FIG. 1, can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
determining, by the processor set, that a compiler option is not provided to enable an assertion for a reachable class in a target application;
determining, by the processor set, that there is no application program interface (API) being used to enable the assertion found in a reachable method in the reachable class in response to a determination that the compiler option is not provided to enable the assertion for the reachable class;
determining, by the processor set, that there is no assertion being executed before an initialization of the reachable class in response to a determination that there is no API being used to enable the assertion found in the reachable method in the reachable class; and
removing, by the processor set, assertion related code from the reachable class in response to a determination that there is no assertion being executed before the initialization of the reachable class.

2. The computer-implemented method of claim 1, further comprising:
determining that the reachable class is initialized at a different time than a compilation time in response to a determination that there is the reachable class in the target application.

3. The computer-implemented method of claim 1, wherein the determining that there is no assertion being executed before the initialization of the reachable class comprises:
    determining whether the reachable method in the reachable class uses an assertion; and
    ending compilation in response to a determination that the reachable method in the reachable class does not use the assertion.

4. The computer-implemented method of claim 1, wherein the determining that there is no assertion being executed before the initialization of the reachable class further comprises:
    finding at least one super class in a reachable class hierarchy from the reachable class; and
    finding a super class of the at least one super class that has a static initializer.

5. The computer-implemented method of claim 1, wherein the determining that there is no assertion being executed before the initialization of the reachable class further comprises:
    traversing a static initializer to check the reachable method; and
    determining whether the reachable method is found in the static initializer.

6. The computer-implemented method of claim 5, wherein the determining that there is no assertion being executed before the initialization of the reachable class further comprises:
    ending compilation in response to determining that the reachable method is found in the static initializer; and
    returning a no in response to determining that the reachable method is not found in the static initializer.

7. The computer-implemented method of claim 1, wherein the reachable method comprises a method which is explicitly invoked in a main method.

8. The computer-implemented method of claim 1, wherein the reachable class occurs when a class is executed by a virtual machine (VM).

9. The computer-implemented method of claim 7, wherein the reachable class and the source code comprises an object-oriented language.

10. The computer-implemented method of claim 1, further comprising outputting a native image with the assertion related code removed from the reachable class.

11. The computer-implemented method of claim 10, further comprising running the native image with the assertion related code removed from the reachable class.

12. A computer program product comprising one or more computer readable storage media having program instructions collectively stored on the one or more computer readable storage media, the program instructions executable to:
    determine that a compiler option is not provided to enable an assertion for a reachable class in a target application;
    determine that there is no application program interface (API) being used to enable the assertion found in a reachable method in the reachable class in response to a determination that the compiler option is not provided to enable the assertion for the reachable class;
    determine that there is no assertion being executed before an initialization of the reachable class in response to a determination that there is no API being used to enable the assertion found in the reachable method in the reachable class; and
    remove assertion related code from the reachable class in response to a determination that there is no assertion being executed before the initialization of the reachable class.

13. The computer program product of claim 12, further comprising:
    determining that the reachable class is initialized at a different time than a compilation time in response to a determination that there is the reachable class in the target application.

14. The computer program product of claim 12, wherein the determining that there is no assertion being executed before the initialization of the reachable class comprises:
    determining whether the reachable method in the reachable class uses an assertion; and
    ending compilation in response to a determination that the reachable method in the reachable class does not use the assertion.

15. The computer program product of claim 12, wherein the determining that there is no assertion being executed before the initialization of the reachable class further comprises:
    finding at least one super class in a reachable class hierarchy from the reachable class; and
    finding a super class of the at least one super class that has a static initializer.

16. The computer program product of claim 12, wherein the determining that there is no assertion being executed before the initialization of the reachable class further comprises:
    traversing a static initializer to check the reachable method; and
    determining whether the reachable method is found in the static initializer.

17. The computer program product of claim 16, wherein the determining that there is no assertion being executed before the initialization of the reachable class further comprises:
    ending compilation in response to determining that the reachable method is found in the static initializer; and
    returning a no in response to determining that the reachable method is not found in the static initializer.

18. The computer program product of claim 12, wherein the reachable class occurs when a class is executed by a virtual machine (VM), and the reachable class comprises an object-oriented language.

19. The computer program product of claim 12, further comprising running a native image with the assertion related code removed from the reachable class.

20. A system comprising:
    a processor set, one or more computer readable storage media, and program instructions collectively stored on the one or more computer readable storage media, the program instructions executable to:
    determine that a compiler option is not provided to enable an assertion for a reachable class in a target application;
    determine that there is no application program interface (API) being used to enable the assertion found in a reachable method in the reachable class in response to a determination that the compiler option is not provided to enable the assertion for the reachable class;
    determine that there is no assertion being executed before an initialization of the reachable class in response to a determination that there is no API being used to enable the assertion found in the reachable method in the reachable class; and remove assertion related code from the reachable class in response to a determination that there is no assertion being executed before the initialization of the reachable class.

* * * * *